US010518463B2

(12) United States Patent
Wagner et al.

(10) Patent No.: US 10,518,463 B2
(45) Date of Patent: Dec. 31, 2019

(54) MOLD FILLING MACHINE

(71) Applicant: KRONES AG, Neutraubling (DE)

(72) Inventors: Martin Wagner, Regensburg (DE); Kai-Uwe Dreger, Neutraubling (DE)

(73) Assignee: KRONES AG, Neutraubling (DE)

( * ) Notice: Subject to any disclaimer, the term of this patent is extended or adjusted under 35 U.S.C. 154(b) by 198 days.

(21) Appl. No.: 15/580,622

(22) PCT Filed: May 3, 2016

(86) PCT No.: PCT/EP2016/059935
§ 371 (c)(1),
(2) Date: Dec. 7, 2017

(87) PCT Pub. No.: WO2016/202497
PCT Pub. Date: Dec. 22, 2016

(65) Prior Publication Data
US 2018/0169927 A1    Jun. 21, 2018

(30) Foreign Application Priority Data

Jun. 17, 2015    (DE) .................. 10 2015 211 136

(51) Int. Cl.
*B29C 49/46*    (2006.01)
*B29C 49/36*    (2006.01)
(Continued)

(52) U.S. Cl.
CPC .............. *B29C 49/46* (2013.01); *B29C 49/06* (2013.01); *B29C 49/36* (2013.01); *B29C 49/42* (2013.01);
(Continued)

(58) Field of Classification Search
CPC ..... B29C 49/36; B29C 49/46; B29C 49/4273; B29C 2049/4294; B29C 2049/4635; B29C 2049/4664; B29C 2049/4682; B65B 3/022
See application file for complete search history.

(56) References Cited

U.S. PATENT DOCUMENTS 4,425,090 A * 1/1984 Hansen ............... B29C 49/4817
264/511
4,707,966 A * 11/1987 Weiler .................... B29C 49/20
264/524
(Continued)

FOREIGN PATENT DOCUMENTS

CN    104972640 A    10/2015
DE    102011011076 A1    8/2012
(Continued)

OTHER PUBLICATIONS

Communication for European Application No. 16721776.9, dated Nov. 19, 2018.
(Continued)

*Primary Examiner* — Robert B Davis
(74) *Attorney, Agent, or Firm* — Marshall, Gerstein & Borun LLP

(57) ABSTRACT

Mold filling machine for producing and filling containers made from preforms, comprising a mold filling station with a mold for receiving a preform, wherein the mold has an opening, such that an opening region of the preform in the mold is accessible, the mold filling station having a treatment unit with at least two treatment subunits, which are arranged movably in the treatment unit in such a way that the treatment subunits can be positioned alternately over the opening and the treatment unit has a sealing element, which can be positioned over the opening of the mold in such a way (Continued)

as to form a gastight space, which includes the interior space of the preform and/or container and the treatment subunits.

12 Claims, 3 Drawing Sheets

(51) Int. Cl.
*B29C 49/42* (2006.01)
*B29C 49/06* (2006.01)
*B29C 49/12* (2006.01)
*B29C 49/28* (2006.01)
*B29L 31/00* (2006.01)

(52) U.S. Cl.
CPC .......... *B29C 49/4273* (2013.01); *B29C 49/12* (2013.01); *B29C 2049/283* (2013.01); *B29C 2049/4294* (2013.01); *B29C 2049/4635* (2013.01); *B29C 2049/4664* (2013.01); *B29C 2049/4679* (2013.01); *B29C 2049/4682* (2013.01); *B29C 2049/4697* (2013.01); *B29L 2031/7158* (2013.01)

(56) References Cited

U.S. PATENT DOCUMENTS

| | | | | |
|---|---|---|---|---|
| 4,790,117 A | * | 12/1988 | Hansen | ............... B29C 49/4817 264/524 |
| 2012/0266567 A1 | * | 10/2012 | Haesendonckx | ....... B29C 49/12 53/456 |
| 2015/0284115 A1 | | 10/2015 | Voth et al. | |

FOREIGN PATENT DOCUMENTS

| | | |
|---|---|---|
| EP | 2295324 A1 | 3/2011 |
| EP | 2930138 A1 | 10/2015 |
| GB | 1027597 A | 4/1966 |
| GB | 1263971 A | 2/1972 |

OTHER PUBLICATIONS

German Search Report for Application No. 102015211136.9, dated Apr. 11, 2016.
International Search Report with Translation for Application No. PCT/EP2016/059935, dated Aug. 9, 2016.
Notification of Second Office Action for Chinese Application No. 201680034908.1, dated Sep. 20, 2019.

* cited by examiner

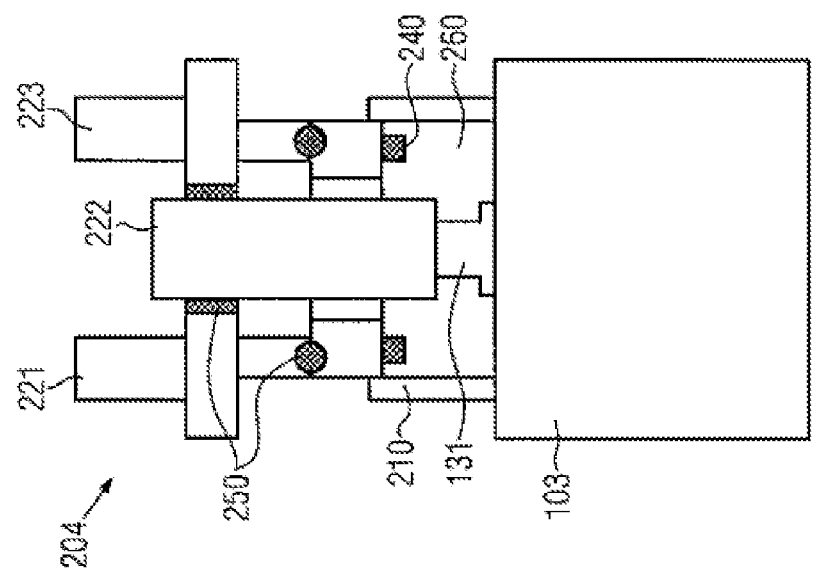
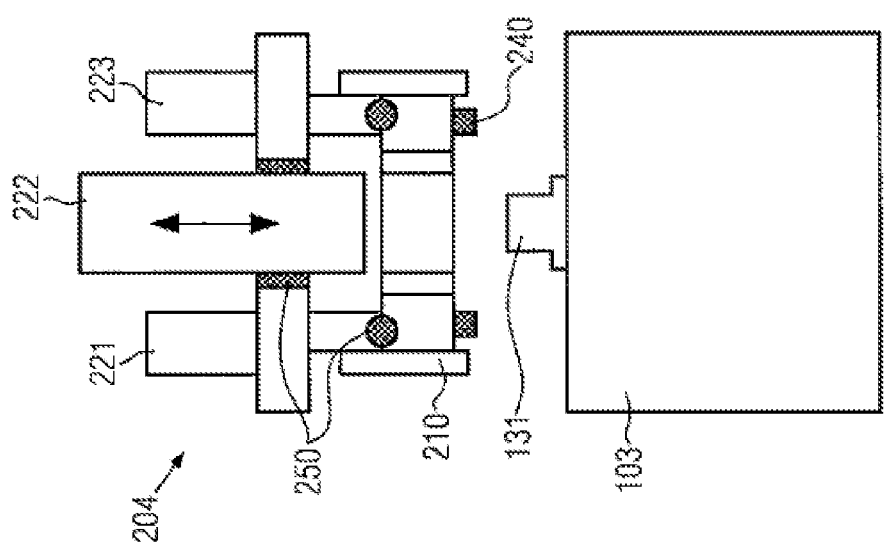

MOLD FILLING MACHINE

CROSS-REFERENCE TO RELATED APPLICATION

The present application is the US national phase of International Application No. PCT/EP2016/059935, filed May 3, 2016, which claims priority to German Application No. 102015211136.9, filed Jun. 17, 2015. The priority applications, PCT/EP16/59935, and DE 102015211136.9, are hereby incorporated by reference.

The present invention relates to a mold filling machine and to a method for producing and filling containers with a mold filling machine.

PRIOR ART

Mold filling machines are already being employed in the beverage processing industry. A preform is introduced into a mold of the mold filling machine provided for this purpose and is shaped into a container and filled within this mold. In the process, the shaping and filling may take place as one single process step, so that the preform is shaped into a container by introducing a liquid medium. As an alternative, the shaping of the preform into a container may initially be effected by means of stretch-blow molding, and the shaped container may subsequently be filled still within the mold.

Currently available mold filling machines are relatively large since the required devices for shaping the container and for filling it need corresponding space. This necessitates, in particular if the mold filling machine is designed as a rotary machine, to use carousels of large radii involving a considerable amount of material stresses in operation.

OBJECT

Starting from known prior art, it is an object of the present invention to indicate a mold filling machine and a method for producing and filling containers made from preforms that requires less space and may simultaneously meet the sterility demands on the containers.

SOLUTION

The mold filling machine according to the invention is characterized in that the mold filling station comprises a treatment unit with at least two treatment subunits which are arranged movably in the treatment unit in such a way that the treatment subunits may be positioned alternately over the container opening, the treatment unit comprising a sealing element that may be positioned over the opening of the mold in such a way that a gastight space is formed which encloses the interior space of the preform and/or of the container and the treatment subunits. In this way, a plurality of (at least two) treatment steps may be performed at the preform or the container with the treatment subunits directly arranged at the station. It is thus no longer necessary to provide areas at the mold filling machine which each comprises one treatment unit for performing a treatment step. The size of the complete mold filling machine may thus be reduced. Furthermore, the sealing element creates a space which insulates the inner side of the preform and the treatment subunits from the surrounding space, thus permitting to better protect the inner side of the container from impurities and to perform the complete treatment of the preform/container not only in a time-saving manner, but simultaneously under controlled conditions.

In one embodiment, the treatment subunits comprise at least two out of a blowing unit, a stretching unit, a filling unit, a closer unit, a degerminating unit, a vacuum unit, a stretch-blow unit, a mold filling unit. Different process steps may thus be already performed within the mold filling machine, thus permitting to reduce the number of subsequent treatment steps and machines required for this. Stretch-blow units are treatment subunits that permit, by means of compressed gas (air) and a stretching device, such as well-known stretching rods, to stretch the preform and to thus shape the preform into a container. Mold filling units in contrast permit to shape the preform into the container by introducing a liquid medium, in particular the product to be filled into the container, under pressure.

In one embodiment, the treatment unit comprises nozzles to provide the gastight space with an overpressure and/or a vacuum. Thus, contaminated air or the like can be prevented from penetrating into the gastight space.

It may be furthermore provided for the treatment subunits to be arranged movably in the mold in a plane perpendicular to the longitudinal axis of the preform. Thus, well-controllable motion sequences, such as rotations or linear translatory movements, may be utilized to correspondingly position the treatment subunits.

In a further development of this embodiment, the treatment subunits may be rotated about an axis parallel to the longitudinal axis of the preform within the mold, and/or translatorily along a path extending perpendicularly to the longitudinal axis of the preform within the mold. The first permits, if the mold filling machine is designed as a rotary machine with a carousel, to save space in the radial direction, while the space requirements in the direction of rotation may be simultaneously kept small. With the translatory movement, the treatment unit may be designed in a space-saving manner perpendicular to the path and the longitudinal axis of the container.

Furthermore, not only the treatment subunits, but the complete treatment unit may be arranged so as to be movable with respect to the mold. It may be, for example, shifted parallel to the longitudinal axis to ensure free motion for the gripping device while the preform is being received in the mold or the finished container is being transferred from the mold.

In one embodiment of the mold filling machine, the latter is designed as a rotary machine or as a linearly operating machine. In case of a linearly operating machine, so-called movers or shuttles may be employed for supplying the treatment units with preforms and/or containers and discharging these therefrom, the movers or shuttles being controllable independently by way of a long-stator linear motor system. Such systems are well-known from prior art.

The method according to the invention for producing and filling containers with a mold filling machine is characterized in that at least two treatment subunits of one treatment unit of the mold filling station are positioned alternately over the opening of the mold and perform, in this position, each one treatment step at the preform and/or at the shaped container, one sealing element being positioned over the opening and thereby forming a gastight space which comprises at least the interior space of the preform in the mold and the treatment subunits. Here, a treatment step is to be understood as any common treatment of a preform and/or container, such as for example the shaping, in particular stretch-blow molding, or the filling of the container and/or the preform. This equally includes to close or sterilize the interior space of the container and/or the preform. With this method, a great number of process steps may be integrated in one mold filling machine, which may reduce the number of required subsequent treatment aggregates, and which also reduces the required time for producing the finished filled and closed container which also reduces, together with the gastight space in which the treatment of the preform/container is performed, the risk of any contamination during the transport to other machines.

In one embodiment, the gastight space is provided with an overpressure and/or vacuum. The penetration of undesired, possibly contaminated air and in particular dust into this region and thus into the interior space of the container may be avoided, thus improving the quality of the container in view of its sterility.

In one embodiment of the method, the treatment subunits are moved within the mold in a plane perpendicular to the longitudinal axis of the preform. The treatment subunits may thus be positioned by a preferably short travel for the treatment subunits, which reduces the treatment time for a container and may increase the throughput of the mold filling machine.

In a further development of this embodiment it is provided for the treatment subunits to rotate about an axis parallel to the longitudinal axis of the preform within the mold, and/or translatorily along a path extending perpendicularly to the longitudinal axis of the preform within the mold. Preferably short travels for the treatment subunits may thus be realized, at the same time achieving space savings.

In another embodiment of the method, the treatment unit is moved with respect to the mold while one preform is located in the mold and/or is being transferred to the mold, and/or one container is being removed from the mold.

BRIEF DESCRIPTION OF THE FIGURES

FIG. 2a shows a first schematic representation of a mold filling station with a sealing element in a non-sealing;

FIG. 2b shows a second schematic representations of a mold filling station with a sealing position;

DETAILED DESCRIPTION

Figure 1:
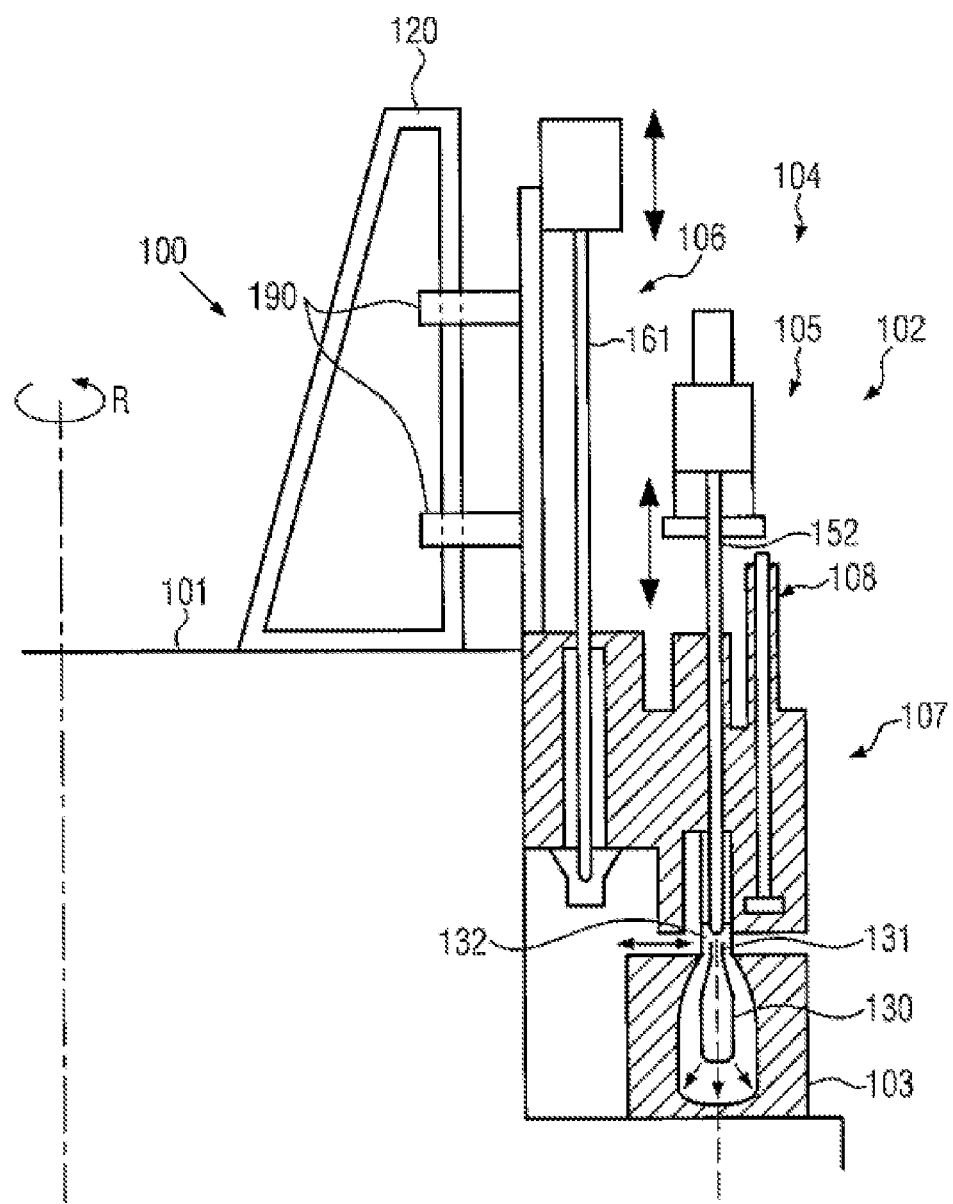
FIG. 1 shows a schematic side view of a mold filling machine according to the invention according to one embodiment.

FIG. 1 shows an inventive mold filling machine 100 according to one embodiment in a side view. The mold filling machine is, in this embodiment, designed as a rotary machine and comprises a carousel 101 rotatable about an axis of rotation R. At the periphery of the carousel, a plurality of mold filling stations 102 are distributed, one of them being represented here by way of example. The design of the mold filling machine as a rotary machine is not compulsory. It may also be embodied as a linearly operating machine. All embodiments described herein may also be employed in such machines. The representation as a rotary machine is thus only given by way of example.

The mold filling station may be attached to the carousel via a mounting 120. To facilitate any repair of a mold filling station, the connection with the carousel via the mounting may be releasable. Preferably, the mold filling station has a modular design and may be released from the mold filling machine together with the mounting as a whole.

The mold filling station 102 comprises a mold 103 for receiving a preform 130. The latter may be shaped into at least one container within the mold and filled within the mold. The mold is designed such that it comprises an opening 132 through which the opening region 131 of the preform 130 in the mold is accessible. This means that the interior space of the preform 130 within the mold 103 may be reached from outside. For example, liquid may be introduced through the opening into the preform. The mold may be a single-split mold and be opened for receiving a preform. Upon the treatment of the preform, the mold may be opened again and release the produced container.

The mold filling station 102 furthermore comprises a treatment unit 104 by which the preform may be treated within the mold 103. In particular, the preform may be shaped into a container and filled with the treatment unit. To this end, the treatment unit comprises several, but at least two treatment subunits 105 and 106 each being able to perform a treatment step at the preform 130 and/or at a shaped container within the mold 103. Here, three treatment subunits 105, 106, 108 are represented by way of example.

The treatment subunits may have various designs. For example, one treatment subunit may be designed as a blow unit for stretch-blowing the preform into a container and to this end comprise, for example, a stretching rod. This is shown in FIG. 1 by reference numeral 161.

A further treatment subunit may be designed as a filling unit. The filling unit may fill a liquid into the preform/container, either in order to shape the preform into the container or thereafter. The liquid may be, for example, the product to be filled into the container. To this end, the filling unit comprises, for example, a filler neck 152 and a supply line for product to be filled into the container, which may lead, for example, through the mounting 120 of the mold filling station to a product reservoir. In particular, the filling unit may be designed as a mold filling unit by which the preform is completely shaped into the container by introducing product. The treatment unit may be fixed to the mounting 120 by means of a guidance 190. In particular, the treatment unit may be held movably with respect to the mounting 120 by means of the guidance in order to be moved in parallel or perpendicularly to the axis of rotation of the carousel.

Furthermore, one treatment subunit may also be designed as a closer unit 108 which may place a closure onto a shaped and filled container. Furthermore, a treatment subunit may be provided, for example, as a degermination/sterilization unit, which may introduce, for example, $H_2O_2$ or another sterilizing gas into the interior space of the preform/container.

As an alternative or in addition, a further treatment subunit may be designed as a vacuum unit that may evacuate the interior space of the container. In this case, in particular a first treatment subunit may perform the shaping of the preform into the container pneumatically and/or mechanically (typically stretch blow molding or stretch blowing with the aid of a stretching rod). Subsequently, the vacuum unit evacuates the interior space of the container. For this, no complete vacuum has to be generated, a negative pressure that is significant with respect to the external pressure may be rather created, for example 0.1 bar or 0.01 bar. Subsequently, the container evacuated in this manner is filled with product by a further treatment subunit, in particular a filler.

By the product being introduced into an evacuated container, the filling of the container may be effected clearly more quickly.

As an alternative, a preblowing of the preform with a gaseous medium may be initially performed, subsequently the interior space of the preblown container may be evacuated, and then a hydraulic shaping of the container by introducing a liquid, in particular the product to be filled into the container, may be performed.

In all these processes, after the filling process, a gas, in particular $CO_2$, may be admitted to the filled container such that an overpressure is created. Thus, during the filling of the container with products containing carbon dioxide, the formation of foam or an escape of carbon dioxide may be avoided.

While the treatment unit comprises, according to the invention, at least two treatment subunits, further, for example three or four, treatment subunits may be provided in the treatment unit. Furthermore, other treatment subunits different from the above-described ones may also be provided.

It is intended according to the invention that the treatment subunits are movably arranged in the treatment unit such that the treatment subunits may be positioned alternately over the opening 132. To this end, the treatment subunits may be arranged, for example, within a frame 107 in which means for moving the treatment subunits relative to the mold 103 are provided. For example, a drive may be provided that may move the treatment subunits. The drive may in particular be an actuator. The treatment subunits may be movable either independently or coupled to each other.

Preferably, the movement of the treatment subunits is performed in a plane that extends perpendicularly to the longitudinal axis L of the preform 130 within the mold 103. Thus, preferably short travels for the treatment subunits can be realized, and it is furthermore not necessary to provide means for moving the treatment subunits in three dimensions. Among the possibilities of moving the treatment subunits those are preferred that exclusively include the rotation or a linear movement (translation) of the treatment subunits.

In addition, the treatment unit 104 may be moved as a whole in parallel to the longitudinal axis L of the preform 130 in the mold 103 corresponding to the represented double arrow. This may be done in particular while a preform 130 is being received in the mold 103 from a supply means, for example a rotary star, or when the treated container is being transferred from the mold 103 to another device. However, even during the treatment of the preform 130 or the shaped container in the mold 103, a movement of the treatment unit 104 in parallel to the longitudinal axis of the preform may be provided.

While it is intended according to the invention that the treatment subunits are moved in a plane perpendicular to the longitudinal axis L of the preform/container, at least parts of a treatment subunit may also be moved in parallel to the longitudinal axis L of the preform 130, in particular into the preform. This is not in contradiction to the movement of the treatment subunit as such. Thus, a treatment subunit may, for example, comprise a stretching rod which must be driven into the preform in the mold for shaping the preform 130 into a container. If furthermore a treatment subunit is designed as a filling unit, an introduction of a filler neck into the opening 132 and in particular also into the opening region 131 of the container/preform may be required to avoid splashing of liquid.

It is furthermore provided according to the invention that the opening 132 forms, together with the treatment unit, a space shut-off from the surrounding area.

In this respect, FIGS. 2a and 2b show a detailed view of the treatment unit 204 with a sealing element 210 in a cross-section along the longitudinal axis of the preform in the mold 103. In FIG. 2a, the arrangement of the treatment unit 204 and the sealing element 210 is shown in a non-sealing position, and in FIG. 2b, the arrangement in a sealing position is shown. The first may preferably be assumed anytime no insulation of the interior space of the container with respect to the surrounding area is necessary, for example after the container has been closed. The sealing position according to FIG. 2b is, in contrast, preferably assumed directly upon the acceptance of the preform in the mold 103.

The sealing element 210 may be designed as a cylinder jacket that is movable along the shown double arrow. To this end, the sealing element is arranged such that it may enclose a space together with the treatment unit 204 and the mold 103 which encloses the opening region 131 of the preform/container and the treatment subunits 221 to 223. In case of the treatment subunits 221 to 223 being designed to be movable in the longitudinal direction of the preform, it may be provided that additionally, sealing elements 250 permit a sealing of the treatment subunits, so that in case of their movement, the insulated space 260 is not contaminated by entering air or the like.

In FIG. 2a, the sealing element 210 is initially located in the non-sealing position. In this position, a preform may be placed into the mold 103 or removed from it. From FIG. 2a to FIG. 2b, the sealing element 210 is then moved such that it defines the space 260 with the mold 103 and the treatment unit 204 and shuts it off with respect to the surrounding area. Here, it is intended that the treatment subunit 222 may be optionally moved into this space and/or into the preform/container, for example to fill the preform/container with product or to shape it into a container.

Here, it is provided for the sealing element 210 to close the space 260 in a gastight manner with respect to the surrounding area. Gastight here means that no surrounding air may penetrate into the sealed space 260. To this end, the sealing element 210 may comprise, at the sides coming into contact with the mold 103, flexible elements, for example made of rubber, to achieve a complete sealing. The connection to the treatment unit 204 may be achieved, for example, via a bellow, so that even during the movement of the sealing element from the non-sealing position into the sealing position, and in particular in the sealing position, no ambient air may penetrate into the space 260 through gaps between the sealing element 210 and the treatment unit 204.

Furthermore, nozzles 240 may be provided which may fill the space 260 with a sterile or sterilizing gas, for example $H_2O_2$ or nitrogen. Here, it may be provided for the nozzles 240 to be able to generate a pressure within the space 260 that is slightly higher than that of the surrounding area, so that even if the space 260 is not perfectly sealed with respect to the surrounding area, a penetration of possibly contaminated ambient air, but also small liquid drops, may be prevented.

It may be advantageous for the preform to be preblown within the space 260 insulated with respect to the surrounding area. To this end, a gas, preferably a sterilizing gas, in particular $H_2O_2$, may be introduced under pressure into the preform by means of one of the treatment subunits, and in this manner, the shaping of the preform into the container may be started. The final shaping may then either be done with the product to be filled in or still with a gas or other methods. By using a sterilizing gas for the preblow process, the sterilization of the interior space of the container may be done during the same treatment step as the preblowing process, this may be effected in particular by the same treatment subunit. This may save time and an additional sterilization unit may be omitted. Furthermore, this embodiment may be particularly advantageously combined with the admission of media to the space 260 through the nozzles 240.

The nozzles 240 may also be used to purposefully create an overpressure within the gastight space during the filling of the container with product. In particular during the filling of the container with products containing carbon dioxide, this may be utilized in order to prevent the formation of foam or the escape of carbon dioxide from the liquid upon termination of the filling procedure. While an overpressure is being applied to the gastight space, the container may be closed, so that even the head region of the closed container which is not filled with product still exhibits an overpressure, so that no carbon dioxide can escape from the product. For this, $CO_2$ may in particular be used.

Furthermore, the nozzles 240 may be utilized to not only fill the space 260 with a sterile gas, the nozzles 240 may rather be also used to effect a sterilization and/or cleaning (in particular with $H_2O_2$) of the interior space of the preform/container within the mold 103 with one of the treatment subunits before the first treatment step. Since the interior space of the preform/container might have been contaminated before by air during the transport into the mold filling machine, at least one of the nozzles may be able to purposefully introduce the sterilizing gas or an inert gas (for example $N_2$) into the opening 131 of the preform. To this end, one or several ones of the nozzles 240 may be movable, so that they are either moved over the opening 131 of the preform/container within the mold 103 and may introduce the gas, or, as an alternative, one or more nozzles may be designed to be swivelling in order to eject gas in the direction of the opening 131. In order to displace contaminated air from the interior space of the preform, a gas having a higher density than the air within the interior space of the preform may be advantageously utilized.

To ensure the sterility of the interior space of the preform during the treatment in the mold filling machine, it is preferred that during the shaping, filling and until after the closing process, the sealing of the space 260 is effected by the sealing element 210. Even if it is intended to perform further treatment steps at the container after the latter has been closed, sealing by means of the sealing element 210 is no longer compulsory since the interior space of the filled and closed container is already insulated through the closure to prevent any penetration of ambient air. Therefore, the sealing element 210 may also be moved to its non-sealing position according to FIG. 2a before the termination of the complete treatment of the container within the mold 103.

It may be furthermore intended that the nozzles 240 for cleaning the space 260 are designed as CIP nozzles or that additional CIP nozzles are provided which may perform a cleaning of the space 260. Cleaning may be initiated manually. As an alternative, cleaning cycles may be automatically performed after a given number of containers or after a given time. Moreover, a cleaning cycle may be performed anytime a malfunction, in particular a burst container in the mold, has occurred.

The nozzles, but also a further treatment subunit in the treatment unit, may be utilized to purposefully degerminate the opening region 131 of the container and/or the preform before treatment in order to prevent impurities in the opening region of the container and/or the preform from penetrating into the interior space of the preform/container during the further treatment.

The nozzles may be furthermore not or not exclusively designed for supplying a sterilizing gas to the space 260, but the nozzles 240 or other nozzles provided in the space 260 may be furthermore designed to create a negative pressure of 0.1 bar, in particular 0.01 bar, preferably a vacuum, within the space 260. The application of negative pressure/vacuum may be performed before the filling of the container with the product to reduce the time required for introducing the product into the container.

Figure 3C:
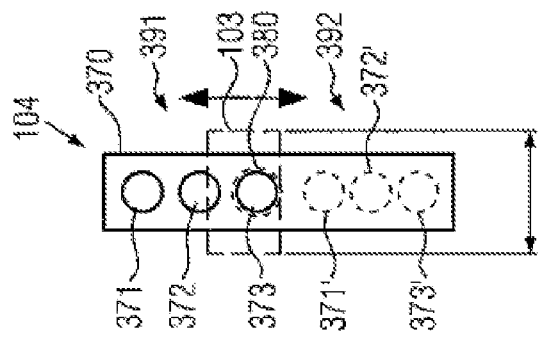
FIG. 3c shows a third schematic plan view of a treatment unit with treatment subunits according to yet a different embodiment.
Figure 3B:
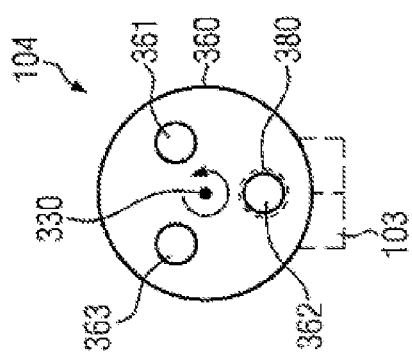
FIG. 3b shows a second schematic plan view of a treatment unit with treatment subunits according to a different embodiment.
Figure 3A:
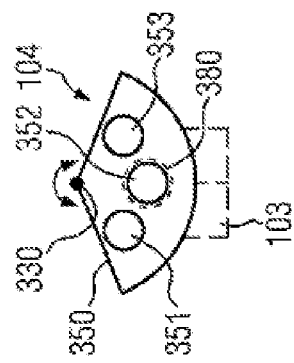
FIG. 3a shows a first schematic plan view of a treatment unit with treatment subunits.

FIGS. 3a to 3c show different embodiments of the treatment unit 104 in a plan view, parallel to the longitudinal axis L of the preform according to FIG. 1. The treatment subunits are here highly simplified shown as circles. This is not to be understood as restricting for the mold of the treatment subunits, it rather serves illustration purposes. In FIGS. 3a to 3c, furthermore not the complete treatment subunits, but only the portion of the treatment subunits within the frame 350, 360 and 370, respectively, are shown.

For the following description of the movement of the treatment subunits, it is preferred if their movement may be effected in such a way that the atmosphere created in the gastight space is not affected. This in particular means that no loss of overpressure and no deterioration of the negative pressure/vacuum in the gastight space is effected by moving the treatment subunits. This may be ensured by also separating/insulating the treatment unit with the treatment subunits disposed therein as a whole from the surrounding area. This may be effected by the frame of the treatment unit that may be designed as enclosed housing. A movement of the treatment subunits within the frame of the treatment unit thus does not lead to any affection of the atmosphere created in the gastight space.

In FIG. 3a, the frame 350, in which the treatment subunits 351 to 353 are disposed, is designed as a segment of a circle/a cylinder. The frame 350 is mounted rotatably about an axis 330 along the shown double arrow. The treatment subunits 351, 352, 353 are disposed within the frame 350, for example at equal distances in the azimuthal direction with respect to each other. Other distributions of the treatment subunits in the azimuthal direction are also conceivable. The axis runs in parallel to the not represented longitudinal axis L of the preform/container within the mold 103.

During the operation of the mold filling machine, treatment subunits are alternately positioned over the opening 380 of the mold 103 and in this position perform a treatment step at the preform/container within the mold 103. Thus, one of the treatment subunits may shape the preform into a container, while another treatment subunit is filling product into the container. A further treatment subunit may close a container within the mold 103. In the process, the movement of the frame 350 with the treatment subunits about the axis 330 is preferably effected such that during the treatment of a preform, a movement exclusively into a direction of rotation is performed, i.e. either in a mathematically positive or negative sense. Thus, a travel of the frame 350 that is unnecessarily time-consuming may be avoided.

In order to realize this, the individual treatment subunits are disposed within the frame such that they are arranged, in the direction of rotation, one after another corresponding to the sequence of the process steps required during the treatment of the preform/container.

As simplified example it is assumed that a shaping of a preform into a container by means of a blow molding process, a subsequent filling and a following closing of the container within the mold 103 are performed with the treatment subunits. It is furthermore assumed that the rotation of the frame with the treatment subunits is effected in a mathematically positive sense. These requirements result in the treatment subunit 353 being a blow unit which may shape the preform into a container using a blow molding process. The treatment subunit 352 is a filling unit which fills the shaped container. The treatment subunit 351 finally is a closer unit which may close the shaped and filled container.

Thus, the frame 350 is moved from a starting position, in which the treatment subunit 353 is positioned over the opening 380 of the mold 103, via an intermediate position, in which the treatment subunit 352 is positioned over the opening 380, to an end position, in which the treatment subunit 351 is positioned over the opening 380. When the corresponding treatment subunit is in the position over the opening 380, it performs the corresponding treatment step at the preform/container within the mold 103. After these three treatment steps have been completed, the frame with the treatment subunits is again moved to the starting position to permit the treatment of a further preform.

For this, it may also be provided that in the direction of rotation of the frame 350 during the treatment of a preform/container, special cleaning means are disposed after the mold 103 which may optionally clean the treatment subunits 351 to 353. Such cleaning means do not have to be provided for each one of the treatment subunits. Thus, in particular for those treatment subunits which are contaminated with liquid, such as product, during the performance of the treatment step, a cleaning means may be provided to clean them before their use during the treatment of the next preform/container. Moreover, a cyclic cleaning at certain time intervals or after a predetermined number of treated containers is conceivable.

FIG. 3b shows a further embodiment in which the frame 360, comprising the treatment subunits 361 to 363, is designed as a cylinder. In this embodiment, the frame 360 with the treatment subunits is designed to be completely rotating about the axis of rotation 330. Required supply lines for the treatment subunits 361 to 363 may be connected with rotary distributors, so that a rotation of the frame 360 may be performed unobstructedly. In contrast to the embodiment according to FIG. 3a, in the embodiment according to FIG. 3b, no reverse rotation of the frame 360 with the treatment subunits might be effected after the completion of the treatment of the container within the mold 103. This means that the movement of the frame is only performed in one direction.

In the embodiment according to FIG. 3b, it is advantageous if after the performance of the last process step, for example with the treatment subunit 363, the frame 360 is rotated further to perform the first treatment step of the following preform/container with the first treatment subunit 361 following in the direction of rotation.

Compared to the embodiment according to FIG. 3a, this embodiment requires more space, however, the times for positioning the treatment subunits after the completion of the treatment of a first container and before the treatment of the following container are reduced.

While it is advantageous for the treatment subunits according to the embodiments in FIG. 3a and FIG. 3b to be firmly connected to the frame 360, in particular in the embodiment according to FIG. 3b, it may be provided for the treatment subunits 361 to 363 to be disposed movably relative to the frame 360. The frame 360 may then only serve to guide the treatment subunits 361 to 363. Furthermore, the treatment subunits may also be independently movable. For this, one drive may be associated with each treatment subunit.

If the treatment subunits are fixed within the frame 360, additional components of the treatment subunits, for example control or drive units, may be provided in the frame 360. The space requirements for the complete treatment unit 104 may thus be reduced.

FIG. 3c shows a further embodiment of the treatment unit 104. In this embodiment, there is no rotation of the treatment subunits 371 to 373. The treatment subunits 371 to 373 are rather moved in a translatory manner, in particular linearly along the shown double arrow, relative to the mold 103.

Here, the frame 370 is fictitiously subdivided into a treatment region 391 and a post-treatment region 392. The treatment subunits 371 to 373 are in this embodiment disposed so as to be movable relative to the frame 370, so that they may be positioned from the treatment region 391 over the opening 380 of the container/preform within the mold 103 and subsequently moved to the post-treatment region 392. As an alternative, the complete frame 370 may be correspondingly moving with the treatment subunits 371 to 373.

In the embodiment according to FIG. 3c, the treatment subunits 371 to 373 are arranged such that in the moving direction of the treatment subunits or the frame 370, respectively, the treatment subunit is arranged corresponding to the first treatment step for a preform/container received in the mold upstream of the treatment subunit for the second treatment step, and the latter is arranged upstream of the treatment subunit for the third treatment step and so forth. Thus, upon completion of the treatment of a preform/container within the mold 103, a passage of individual treatment subunits past other treatment subunits to return them to the starting position may be omitted.

The movement of the treatment subunits, either together with the frame 370 or within the frame, is done as follows: initially, the first treatment subunit 373 is positioned over the opening 380 of the mold 103 and performs the first treatment step at the preform/container within the mold 103 (for example the shaping of the preform into the container). Subsequently, the treatment subunit 373 is moved into its post-treatment position 373' (here shown in a dashed line). Already during this, the treatment subunit 372 may be positioned over the opening 380 and perform the second treatment step. Subsequently, the latter is also moved into its post-treatment position 372'. During this or after this step, the third treatment subunit 371 may be positioned over the opening 380 and perform the third treatment step. Subsequently, the latter is also moved into its post-treatment position 371'.

Subsequently, the treatment subunits 371 to 373 are moved to their starting positions in the treatment region 391 in reverse order. This means that the third treatment unit 371 is moved from its post-treatment position 371' back to the originally shown position. Subsequently or simultaneously, the second treatment subunit is moved from the position 372' into the original position and subsequently or simultaneously, the first treatment subunit 373 is moved from its post-treatment position 373' into its original position.

In the embodiment according to FIG. 3c, too, cleaning means for one or several ones of the treatment subunits may be provided in the post-treatment region 392, the means permitting the cleaning of the corresponding treatment subunit in its post-treatment position.

In particular in the embodiment according to FIG. 3c, the diameter of the frame 370 and preferably of the complete treatment unit may be smaller than the diameter d of the mold 103. In the embodiment of the mold filling machine as a rotary machine, the diameter d of the mold 103 runs in the direction of rotation. By this, the limiting factor for the number of mold filling stations along the circumference of the carousel of the mold filling machine is the size, in particular the diameter, of the molds. Compared to common mold filling machines, one may thus achieve that the number of molds does not have to be reduced to the benefit of a more effective process management.

The invention claimed is:

1. A mold filling machine for producing and filling containers made from preforms, comprising a mold filling station with a mold for receiving a preform, wherein the mold has an opening, such that an opening region of the preform in the mold is accessible, the mold filling station comprises a treatment unit with at least two treatment subunits, which are arranged movably in the treatment unit in such a way that the treatment subunits can be positioned alternately over the opening, and the treatment unit comprises a sealing element which can be positioned over the opening of the mold in such a way as to form a gastight space which includes the interior space of at least one of the preform or the container and the treatment subunits.

2. The mould filling machine according to claim 1, wherein the treatment subunits comprise at least two of a blow unit, a stretch unit, a stretch-blow unit, a filling unit, a mold filling unit, a closer unit, a degerminating unit, and a vacuum unit.

3. The mould filling machine according to claim 2, wherein the treatment unit comprises nozzles for applying at least one of an overpressure or a vacuum to the gastight space.

4. The mould filling machine according to claim 1, wherein the treatment subunits are arranged to be movable in a plane transverse to the longitudinal axis of the preform in the mold.

5. The mould filling machine according to claim 4, wherein the treatment subunits may be rotated about an axis parallel to the longitudinal axis of the preform in the mold and/or wherein the treatment subunits may be moved translatorily along a path extending transversely to the longitudinal axis of a preform in the mold.

6. The mould filling machine according to claim 1, wherein the treatment unit (104) is arranged to be movable with respect to the mold (103).

7. The mould filling machine according to claim 1, wherein the mold filling machine is designed as one of a rotary machine or as a linearly operating machine.

8. A method for producing and filling containers with a mold filling machine, wherein a preform is introduced into a mold of a mold filling station and the opening region of the preform is accessible through an opening in the mold, at least two treatment subunits of a treatment unit of the mold filling station are alternately positioned over the opening of the mold and in this position perform a treatment step at the preform and/or at shaped containers, and wherein a sealing element is positioned over the opening, and a gastight space is created by the sealing element, which space comprises at least the interior space of the preform within the mold and the treatment subunits.

9. The method according to claim 8, wherein an overpressure and/or vacuum is applied to the gastight space.

10. The method according to claim 8, wherein the treatment subunits are moved in a plane transverse to the longitudinal axis of the preform within the mold.

11. The method according to claim 10, wherein the treatment subunits rotate about an axis (330) parallel to the longitudinal axis of the preform in the mold and/or are moved translatorily along a path extending transversely to the longitudinal axis of the preform in the mold.

12. The method according to claim 8, wherein the treatment unit is at least one of moved with respect to the mold while a preform is located in the mould, transferred to the mold, or a container is being removed from the mold.

* * * * *